June 27, 1967 A. V. HUEGEL 3,327,800
AIR CUSHION VEHICLE TRUNK SYSTEM
Filed Aug. 29, 1966 5 Sheets-Sheet 3
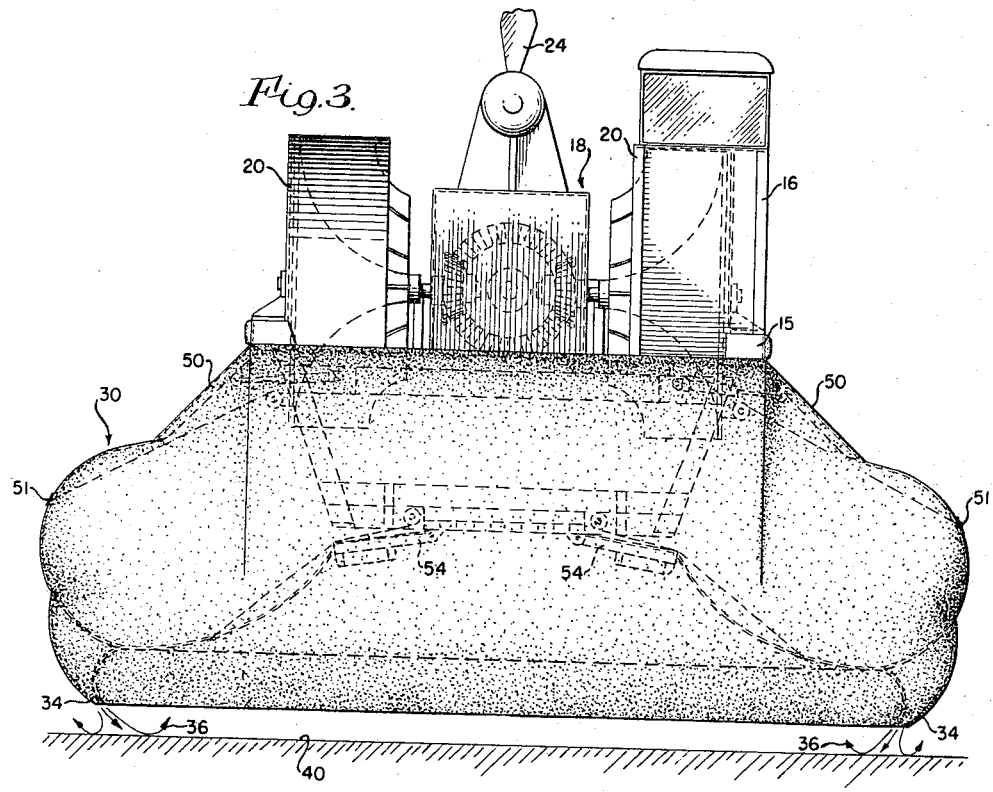
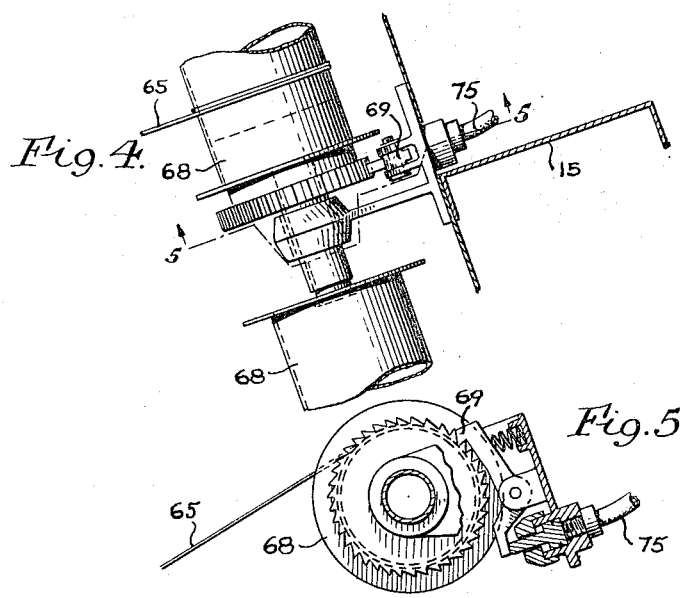
INVENTOR.
ALBRECHT V. HUEGEL
BY
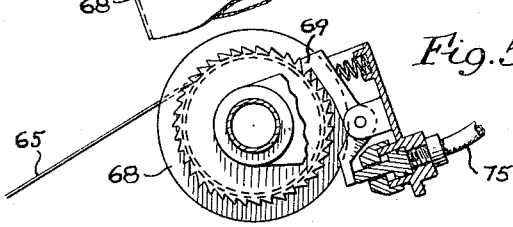
ATTORNEYS

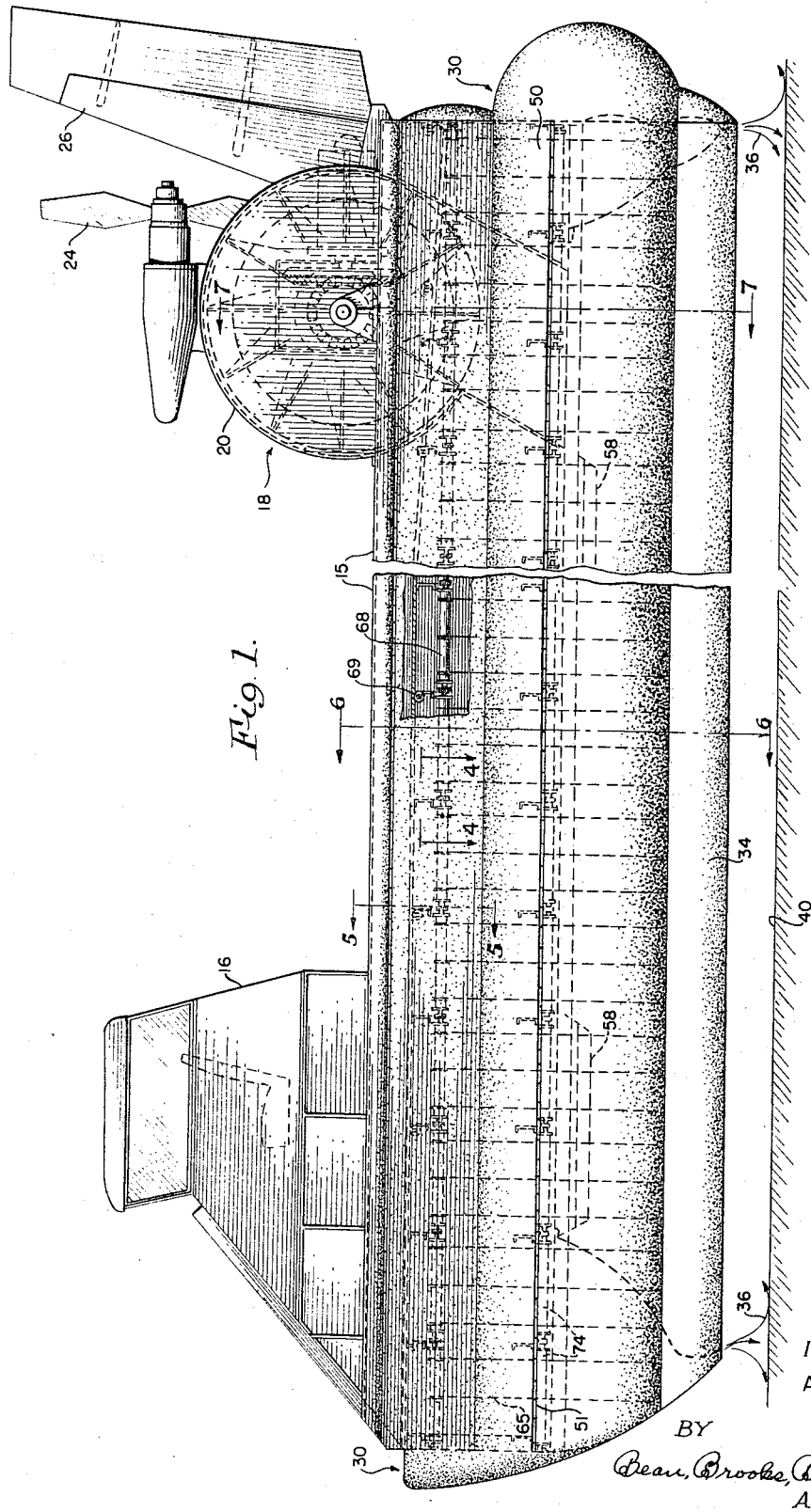

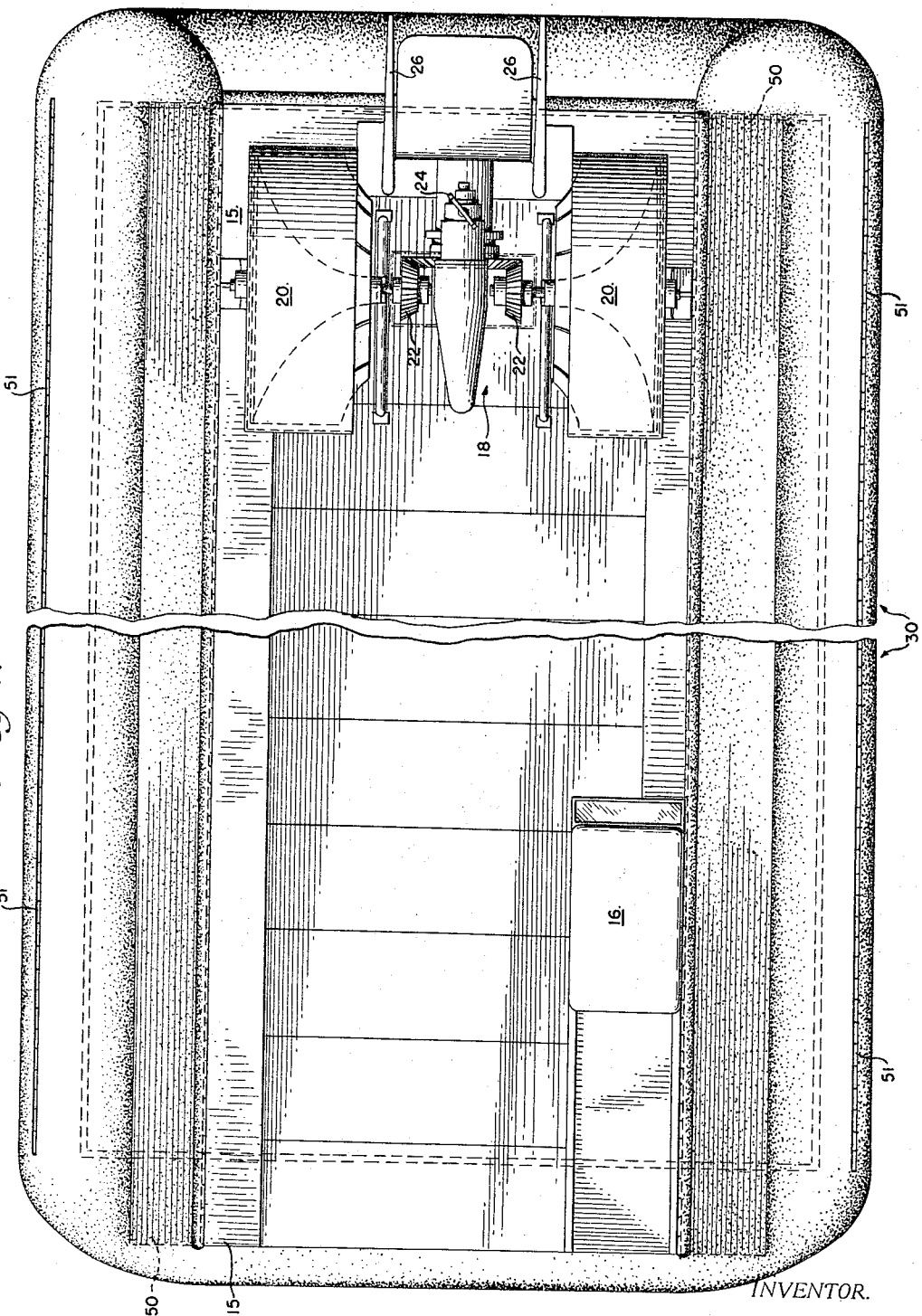

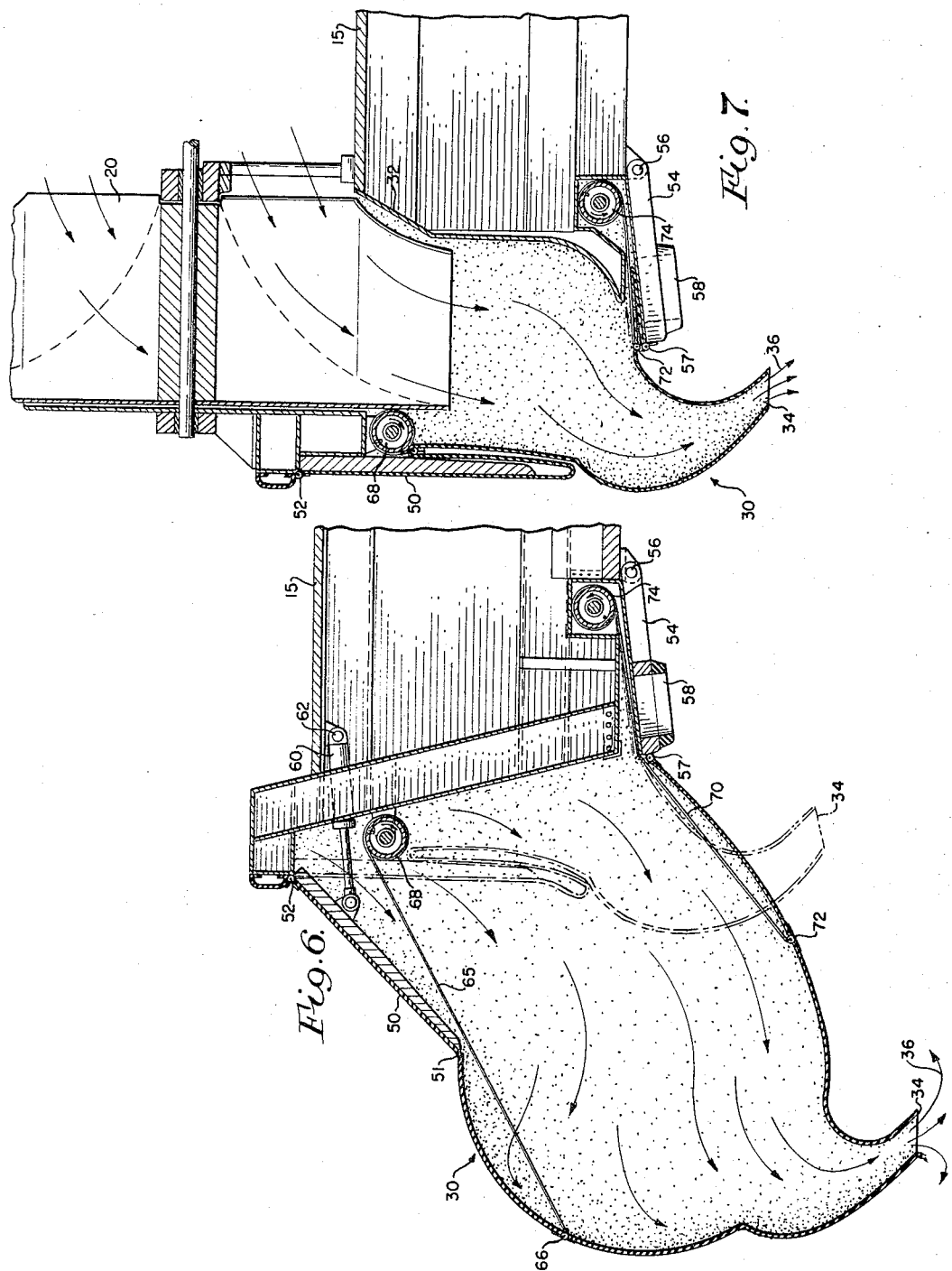

June 27, 1967     A. V. HUEGEL     3,327,800
AIR CUSHION VEHICLE TRUNK SYSTEM
Filed Aug. 29, 1966     5 Sheets-Sheet 5
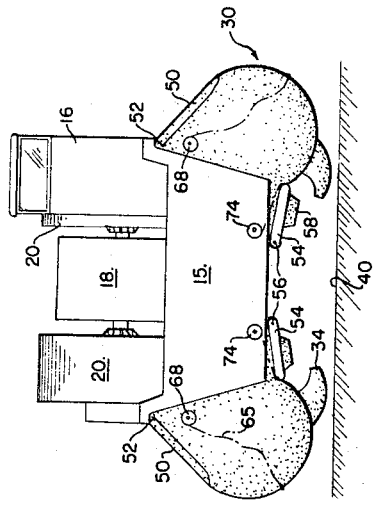
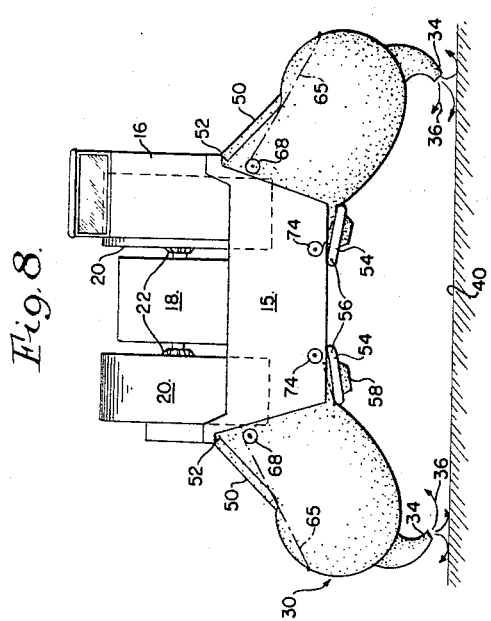
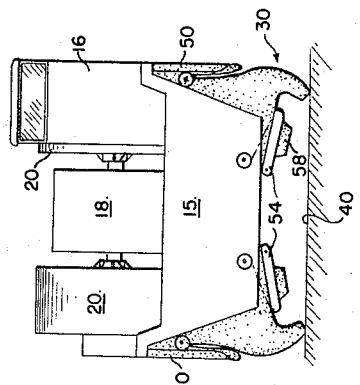
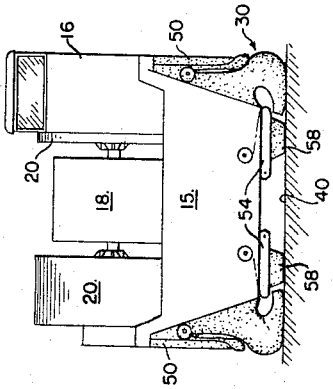
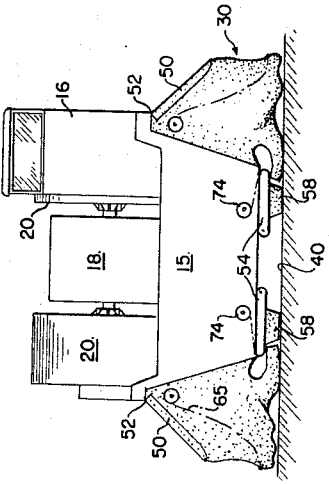
INVENTOR.
ALBRECHT V. HUEGEL
BY
Bean, Brooks, Buckley & Bean
ATTORNEYS United States Patent Office 3,327,800
Patented June 27, 1967

3,327,800
AIR CUSHION VEHICLE TRUNK SYSTEM
Albrecht V. Huegel, Wilson, N.Y., assignor to Bell
Aerospace Corporation, Wheatfield, N.Y.
Filed Aug. 29, 1966, Ser. No. 575,665
6 Claims. (Cl. 180—7)

This invention relates to vehicles for traveling over land and/or water surfaces, of the type generally known as "ground effect machines" or "air cushion vehicles."

It is an object of the present invention to provide improvements in the aforesaid type vehicles to reduce, when inoperative, their overall width dimensions; whereby to in turn reduce the storage areas requisite to accommodate pluralities of such vehicles; such as when being loaded into sea going vessels, landing craft, or other parking areas; or whenever it is vital to hold to a minimum the required parking area.

Another object is to provide improvements in vehicles as aforesaid whereby whenever the laterally outstanding inflatable trunk structures defining the air cushion confining components thereof are retracted into reduced-width positions, they are concomitantly "armoured" by means of rigid plate devices, thereby protecting the parts from external contact damage.

Another object of the invention is to provide an improved mechano-structural arrangement in vehicles as aforesaid, for automatically corelating operations of the actuating mechanisms for accomplishing the aforestated purposes.

Still another object is to incorporate in machines or vehicles as aforesaid means providing for improved parking maneuvering of such craft without the use of conventional ground handling equipment such as dollies, tractors, cranes, or the like.

Other objects and advantages of the invention will appear from the following specification and the accompanying drawing wherein:

FIGURE 1 is a side elevational view of a vehicle as aforesaid embodying the present invention and shown in air cushion supported mode:

FIG. 2 is a fragmentary top plan view thereof;

FIG. 3 is a front end elevational view thereof;

FIG. 4 is a fragmentary sectional view on enlarged scale taken as suggested by line 4—4 of FIG. 1;

FIG. 5 is a fragmentary sectional view taken as suggested by lines 5—5 of FIGS. 1 and 4;

FIG. 6 is a fragmentary enlarged scale sectional view taken as suggested by line 6—6 of FIG. 1;

FIG. 7 is a fragmentary enlarged scale sectional view taken as suggested by line 7—7 of FIG. 1;

FIG. 8 is a diagrammatic front elevational view illustrating operation of the machine as an air cushion supported vehicle;

FIG. 9 is a view corresponding to FIG. 8 but illustrates the air cushion boundary trunk system of the vehicle in partially retracted position;

FIG. 10 corresponds to FIGS. 8, 9, but illustrates how the vehicle may be brought to rest upon a ground surface or the like, while the air cushion boundary trunk device thereof is still in only partially retracted positions;

FIG. 11 corresponds to FIG. 10 but illustrates how the trunk device of the vehicle may be still further retracted and "armoured" against external damage incidental to a parking or storage operation; and FIG. 12 corresponds to FIG. 11 but illustrates how a vehicle of the present invention may be levitated for parking maneuvering purposes or the like.

As shown at FIGS. 1–3 herewith the present invention may be embodied in a "ground effect" or "air cushion vehicle" comprising a rigid frame or deck structure designated generally at 15 carrying a passenger pilot cabin structure 16; a power plant and driving gear unit as indicated generally at 18; lift-air supply fan units as indicated generally at 20, 20 which are operatively coupled to the power plant 18 as indicated at 22; a forward propulsion propeller 24 which is operatively coupled to the power plant; and a steering rudder unit as indicated at 26. The frame portion 15 is shown herein as being generally of hollow rectangular box form, and the "lift" fan devices 20—20 are constructed and arranged to take in air axially from exteriorly thereof, and to discharge it under pressure into a duct system within the interior of the frame structure 15.

The lower portion of the frame structure 15 is generally circumscribed by a trunk-type skirt which when inflated is of rectangular toroidal form as illustrated at 30. The frame structure is suitable apertured as indicated at 32 (FIG. 7) to accommodate the air discharge from the fans 20–20 and to lead it into the trunk-skirt system. Thus it will be appreciated that upon operation of the fans 20–20 the trunk structure 30 will be inflated such as to the condition shown in FIGS. 1, 2, 3 in the drawing herewith. The trunk system is formed along the bottom peripheral areas thereof with a row of air outlets of nozzle form as indicated at 34 (FIGS. 3, 8). Thus, as illustrated diagrammatically in FIGS. 1, 3, 6, 7, 8, whenever the fans 20–20 are operative the discharge air therefrom will be delivered under pressure in the manner indicated by the directional arrows 36 (FIGS. 1, 3, 6, 7, 8) into the chamber beneath the machine delineated by the trunk system 30, thereby being operative to levitate the machine relative to a ground or water surface or the like as indicated at 40 (FIGS. 1, 3, 8–12) in the well known peripheral-jet type air cushion vehicle manner.

As shown in FIGS. 3, 6, 8, when the skirt-trunk is supplied with a full compliment of pressured air from the fans 20–20 it extends in plan view peripherally of the vehicle structure in all directions, to maximum degree within the confines of the structural limitations of the trunk fabric. In consequence the trunk system extends laterally beyond the frame structure to a substantial degree thus providing the vehicle with a substantially broadened air-lift cushion base. However, by virtue of this arrangement when the machine is in operational regime the skirt-trunk structure necessarily occupies a substantially enlarged plan view area compared to the corresponding area of the rigid hull or frame 15 of the machine. Hence, it is apparent that the "parking area" requirement for the vehicle when non-operational is substantially less than the area occupied when operational as an air cushion vehicle.

In accordance with the present invention novel means are provided in cooperation with the skirt-trunk structure so as to force the latter to contract into plan view compacted condition when the vehicle is being prepared for storage or parking. As shown by way of example in the drawing herewith said skirt control means may include a pair of rigid plate members 50—50 which are hingedly connected as indicated at 52—52 to opposite sides of the vehicle frame structure so as to be swingable between the positions thereof shown in FIGS. 6–12 inclusive. These plates 50—50 encompass the upper external side view portions of the skirt-trunk structure and are hingedly connected along their bottom edges to the skirt fabric by hinge devices 51 (FIGS. 1, 3, 6). Bottom plates 54, 54 are pivotally mounted upon the bottom frame structure as indicated at 56, 56 (FIGS. 6–12) to similarly encompass the upper internal side view portions of the skirt-trunk structure, and are hingedly connected to the skirt structure by means of hinges 57 (FIGS. 6, 7). The bottom plates 54, 54 are preferably equipped with wear pads 58 to provide improved ground contact wearing surfaces for supporting the vehicle when on the ground as illustrated for example at FIGS. 10, 11.

Force-strut means in the form of a series of hydraulic piston-cylinder units 60 as illustrated at FIG. 6 are provided at suitably spaced stations longitudinally of each upper plate member 50 and are operably interconnected between the plate and the fixed frame structure as indicated at 62, whereby extension-retraction operations of the actuators 60 will cause the plates 50 to swing on their hinge supports between the outstanding positions thereof shown in FIGS. 6, 8, 10 and their inwardly retracted vertically standing positions as illustrated at FIGS. 7, 11, 12. Alternatively, the system may be arranged so that the hydraulic jack devices operate only to pull the side plates inwardly; the inflating air pressure being utilized to cause the plates to swing out as the trunks are inflated.

To assist in proper compaction of the trunk fabric within the relatively constricted spaces between the vehicle frame and the side plates when the trunks are deflated as shown in FIGS. 7, 11, 12, a series of cables as indicated at 65 (FIGS. 4–10) are attached at their outer ends as indicated at 66 (FIG. 6), to vertically intermediate outer wall portions of the trunk structure, and at their inner ends they connect to and train around winches 68 which are arranged to be locked in retracted positions by ratchet devices as indicated at 69 (FIGS. 4, 5). Similarly, a series of lower cables 70 are connected at their outer ends as indicated at 72 (FIG. 6) to vertically intermediate portions of the interior wall sections of the trunk structure, and at their inner ends train around winch devices as indicated at 74; the winch mechanisms being arranged to be driven under pilot-control by any suitable power device. The ratchet devices are pilot-released by means of a hydraulic power system as indicated at 75 (FIGS. 4, 5).

The mechanism of the invention is susceptible of alternative operational procedures. Assuming, that the machine has completed an operational mission as a "ground effect" vehicle, in the mode illustrated at FIG. 8, it may be simply "docked" at the desired point and the engines are shut off; whereby it will settle down against the dock surface. Or, it may be initially docked adjacent a parking or storage facility and then "warped" or shifted across a parking area surface such as into a compactly stored position relative to one or more previously parked vehicles, or the like. To facilitate such a maneuver the machine may be maintained in the aircushion-supported mode while at the same time the lateral overall dimensions of the machine are reduced by first operating the winches 74—74 so as to pull in the lower inside segments of the trunk structure such as to the condition shown at FIG. 9. Thus, while operating in this regime the machine may be easily shifted in any direction horizontally until the desired storage spot has been reached.

The cushioning air pressure generating fans are then stopped; whereupon the aircushion support fades out and the air trunks deflate and the machine settles down to rest directly upon the parking surface, as illustrated at FIG. 10. The winches 68 may thereupon be operated to draw in the outermost segments of the trunk structure while the hydraulic jacks 60 are actuated to pull the cover plates 50—50 downwardly and inwardly; whereby the system now assumes a condition as illustrated at FIG. 11. Note that the machine now rests firmly on the rigid pressure pads 58—58 while the trunk device 30 is inwardly compacted under the rigid hull or frame structure of the machine; while the plates 50—50 armour the bag fabric against damaging contacts with circumadjacent objects.

To subsequently reactivate the machine in the aircushion-supported regime, it is only necessary to restart the lift air pressure generating fan engine. Compressed air is thereby driven through the trunk structure to issue from the orifices 34 thereof, thereby creating a levitating air cushion under the machine, causing it to rise from the parking surface as illustrated at FIG. 12. The trunk structure 30 thereupon balloons down as shown at FIG. 12 within the limits permitted by the positionings of the cover plates 50, 54, whereby the machine is now standing in friction-free relation to the parking surface while the trunk structure 30 remains laterally retracted out of brushing contacts with adjacent objects. Thus the machine may now be easily shifted horizontally as may be desired, "warp" it out of the storage area and toward a position providing more ample operating room. The trunk system may then be released to permit it to inflate to its normal operative condition as shown at FIG. 8, simply by release of the restraining hydraulic jacks and ratchets controlling the cables 65, 70. Hence the machine is now operative with an advantageously broadened aircushion support base as explained hereinabove.

It is of course to be understood that whereas only one form of the invention has been illustrated and described hereinabove by way of example in connection with only one form of aircushion supported machine, application of the invention is not limited thereto and various changes may be made in the system illustrated and described hereinabove without departing from the spirit of the invention and/or the scope of the following claims.

I claim:
1. In an air cushion supported machine comprising a main body portion and an air inflatable trunk of flexible fabric including slots at the bottom portion thereof for the emission of a jet curtain or air therefrom comprising a portion of the air cushion confining skirt of said machine, and wherein said trunk when inflated extends horizontally beyond the planform profile of said main body portion, the improvement comprising:

rigid plate means hingedly connected to said main body portion and overlapping a substantial portion of the outboard surface area of said trunk structure, said plate means being adapted to hingedly swing from substantially vertical hanging retracted condition into laterally extended condition concomitantly with inflation of said trunk device, and means connected to said plate means and operative to cause it to swing to retracted position and to thereupon compact thereunder a substantial portion of said trunk structure, thereby confining the latter to the planform profile of said machine main body portion.

2. A machine as set forth in claim 1 wherein said trunk comprises a generally toroidal-shaped structure having parallel side portions, and wherein said rigid plate means comprises a pair of plates operably associated respectively with said trunk side portions.

3. A machine as set forth in claim 1 wherein said means operative to cause retraction of said plate means comprises a pilot-controlled force strut mechanism.

4. A device as set forth in claim 3 wherein means are also provided under pilot-control to selectively retract portions of said trunk fabric into compacted position relative to said machine main body portion independently of retraction motions of said plate means.

5. A machine as set forth in claim 3 wherein said force strut mechanism comprises a hydraulic jack device.

6. A machine as set forth in claim 4 wherein said trunk fabric retracting means comprises pull cables attached to different portions of said fabric.

No references cited.

A. HARRY LEVY, *Primary Examiner.*